United States Patent
Unnewehr

[15] 3,697,839
[45] Oct. 10, 1972

[54] BRIDGE CIRCUIT CONTROLLER AND PROCESS FOR SUPPLYING ELECTRICAL ENERGY TO A VARIABLE RELUCTANCE MOTOR

[72] Inventor: Lewis E. Unnewehr, Birmingham, Mich.

[73] Assignee: Ford Motor Company, Dearborn, Mich.

[22] Filed: March 8, 1971

[21] Appl. No.: 121,654

[52] U.S. Cl. .................318/138, 318/166, 318/227
[51] Int. Cl. .............................................H02k 29/00
[58] Field of Search.......................318/138, 166, 227

[56] References Cited

UNITED STATES PATENTS

| 3,529,220 | 9/1970 | Kobayashi et al. | 318/138 |
| 3,530,350 | 9/1970 | Gawron et al. | 318/138 |
| 3,389,315 | 6/1968 | Andreas et al. | 318/227 |

*Primary Examiner*—Gene Z. Rubinson
*Attorney*—John R. Faulkner and Robert W. Brown

[57] ABSTRACT

Described is a control circuit for the application of direct current electrical energy to the winding of a variable reluctance motor. Brushless operation of a variable reluctance motor, and torque and speed control thereof, may be achieved with controller circuitry including a four-arm electrical bridge, each of the four bridge arms including a solid state switching device. A capacitor is connected to the bridge and may be connected across one pair of opposed terminals of the bridge, and the motor winding is connected between the other pair of opposed terminals of the bridge. The energy source is connected to the bridge. At least one other solid state switching device is provided, this having one of its terminals connected to the energy source and another connected to the bridge.

11 Claims, 10 Drawing Figures

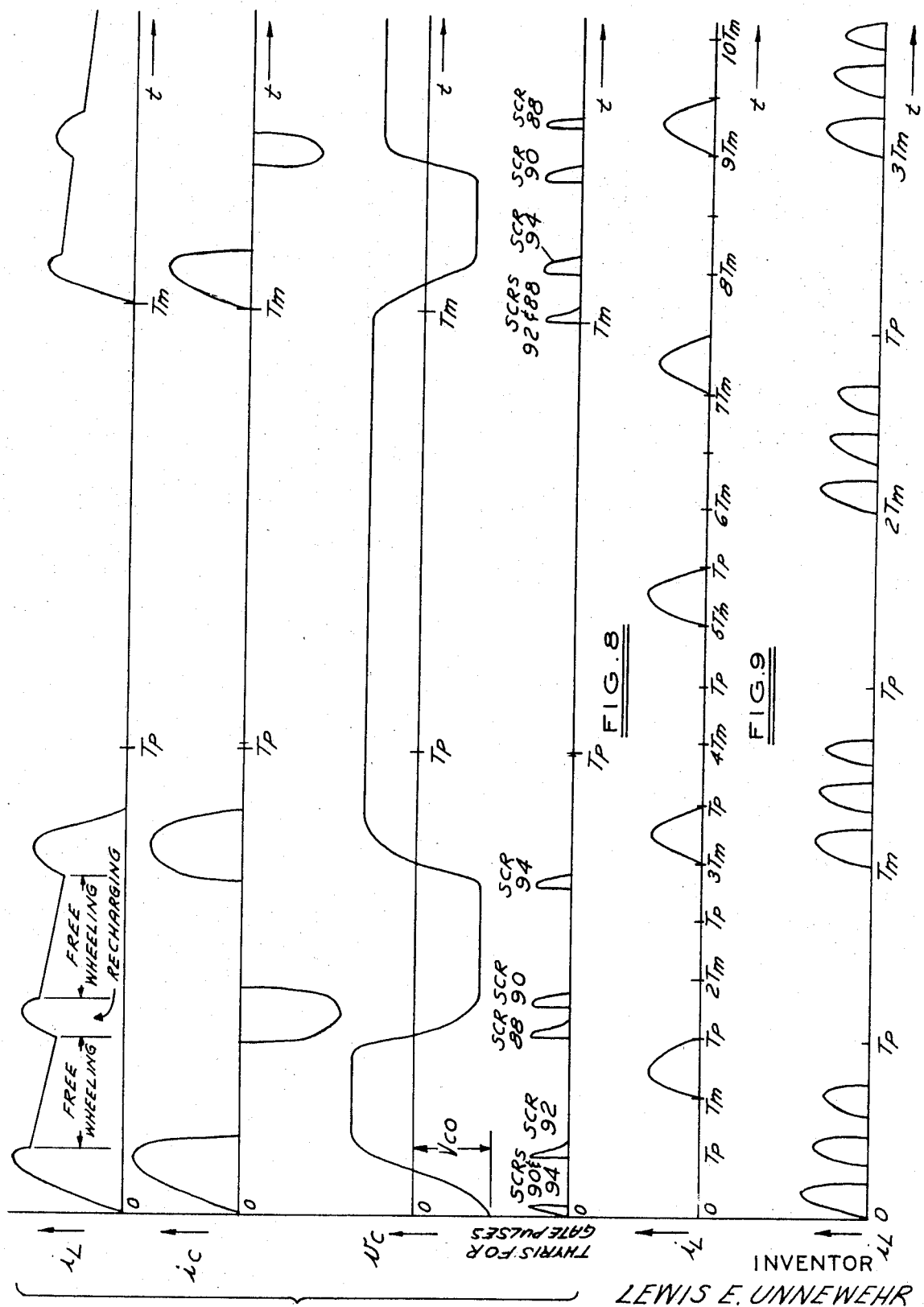

BRIDGE CIRCUIT CONTROLLER AND PROCESS FOR SUPPLYING ELECTRICAL ENERGY TO A VARIABLE RELUCTANCE MOTOR

BACKGROUND OF THE INVENTION

This invention relates to a motor controller. More particularly, it relates to a control circuit for supplying direct current electrical energy to a variable reluctance motor.

The term "variable reluctance motor" as used herein refers to a machine, actuator, or electro-mechanical transducer which employs a magnetic circuit, in association with one or more exciting windings, and a ferromagnetic armature or rotor and which generates mechanical torque or force which is substantially proportional to the square of the winding ampere-turns and to the time rate of change of permeance (reciprocal of reluctance) as a function of the displacement of the armature or rotor. Typically, these motors employ a stator containing a single motor winding for each phase and a rotor containing ferromagnetic material. Displacement of the rotor relative to this stator produces a variation in reluctance, and hence permeance, of the magnetic circuit enclosed by the motor winding. Of course, displacement of the rotor relative to this stator also produces a variation in the self-inductance of the motor winding, this self-inductance being directly related to the permeance of the magnetic circuit.

The torque or force produced by such a variable reluctance motor is proportional to the product of the square of the winding ampere-turns and the rate of change of permeance as a function of rotor displacement. From the preceding, it is apparent that motor torque or force that is positive with respect to some arbitrary reference can only be developed when winding ampere-turns are sustained during an interval in which the permeance increases with rotor displacement. Conversely, negative motor torque or force is developed when winding ampere-turns are sustained during an interval in which the permeance decreases with rotor displacement. Thus, in order to secure continuous rotation of the variable reluctance machine, it is necessary to apply ampere-turns to the motor winding during intervals of increasing permeance and to decrease or eliminate such ampere-turns during intervals of decreasing permeance. The application of ampere-turns during intervals of decreasing permeance results in a braking action.

From the above discussion, it is apparent that the winding of the variable reluctance motor must be excited from a time-varying source. Furthermore, the time variations of the source must be synchronized with the mechanical rotation of the machine rotor so that winding current is supplied to the motor during intervals in which the permeance increases with displacement and so that such current is interrupted during intervals in which the permeance is decreasing with displacement. When a time-invariant source of electrical energy, such as a direct current source, is used, a controller is required to produce synchronized pulsations of winding ampere-turns. Hence, operation of a variable reluctance motor requires the use of a controller capable of supplying to the motor winding a current which is periodically interrupted at appropriate rotor positions. Since the developed torque is proportional to the square of the ampere-turns, the controller in principle may supply direct current, alternating current, or a combination of both.

SUMMARY OF THE INVENTION

The controller of the invention couples a source of electrical energy to a variable reluctance motor to provide a high degree of electrical efficiency without the use of brushes. Winding current may be shaped to approach a desired waveform, and speed control may be achieved, when the control circuit of the invention is used in conjunction with appropriate logic circuitry designed to accomplish a desired end result. Various operational modes for the controller circuitry may be used to effect speed and torque control over the speed range in which the variable reluctance motor is intended to function.

In accordance with one aspect of the invention, a controller for a variable reluctance motor comprises an electrical bridge connected to a direct current source of electrical energy. The electrical bridge has four arms, each of the arms including a solid state switching device. The connection points of the four arms form first and second pairs of opposed terminals. A capacitor is connected to the electrical bridge and may be connected across the first pair of opposed terminals, and the motor winding is connected across the second pair of opposed terminals. At least one other solid state switching device is used in association with the electrical bridge and the source for providing a commutatable conduction path therebetween. This solid state switching device is connected at one of its terminals to the DC source of electrical energy and at another of its terminals to the electrical bridge or to the capacitor.

Although the solid state switching devices for the controller circuitry illustrated and described hereinafter are silicon-controlled rectifiers, other types of thyristors or three-terminal solid state devices, such as power transistors, triacs, and the like, may also be applicable. The gates or bases of these switching devices are driven by appropriate logic circuitry.

The controller circuitry of the invention provides the complete integration of all commutation circuitry into the motor winding circuitry, the word "commutation" referring to the process for changing a solid state switching device from its conductive state to its non-conductive state. A separate commutation circuit is not required, and current through the circuit's capacitor passes through the motor winding. Also, there are fewer electrical losses as a result of the elimination of the reversing inductor required in most controller circuits. Additionally, the controller circuitry can be used for many operational modes of control, thus, permitting motor operation over a wide speed range and over a wide voltage range, even where a fixed voltage source is employed. Motoring and generating action are equally possible with only one set of solid state switching devices, and load sharing among these devices is possible in several of the available control modes. Furthermore, the controller circuitry minimizes the energy interchange between the variable reluctance motor and its source, thereby, to improve system efficiency.

One of the principal features of this invention is the capability of varying the magnitude of a current pulse over a considerable range even though the energy-source voltage is invariant. Current pulse magnitude may be varied by controlling the magnitude of the voltage stored in the capacitor at the end of a current pulse. This feature can be used in conjunction with various other control modes to be described and can be considered as the voltage regulatory function of the controller system. Also, this feature reduces the number of necessary current pulses into and out of the energy source, thus improving the source efficiency.

A disc-type variable reluctance motor preferably is used with the controller of this invention. Smooth torque generation is provided by using multiple phases, preferably three or more. Each phase comprises a toroidal winding that surrounds a stator disc having pie-shaped sections of laminated steel spaced by minimum permeance sections usually made of aluminum or reinforced polymeric materials. A rotor disc of similar construction is mounted on each side of the stator disc. The periphery of each rotor is wound within a thin layer of a high strength, low permeance material, such as fiberglass, to increase the maximum potential rotor speed.

In addition to the controller of the invention, the operation of the variable reluctance motor requires the use of logic circuitry. The logic circuitry performs the function of gating or otherwise controlling the operation of the various solid state switching devices included in the controller circuit. The specific design of such logic circuitry depends upon the desired mode or modes of operation of the controller circuitry in view of reluctance motor performance requirements and, therefore, does not constitute a part of this invention. Moreover, the design of logic circuitry to provide a sequence of gating pulses or the like sufficient to operate the controller circuitry of the invention is within the skill of the art.

In association with he logic circuitry, a position sensor may be connected to the motor shaft. The position sensor may be used to indicate the onset of an interval of increasing magnetic permeance. It may, for example, comprise a disc rotatably attached to the motor shaft, the disc having apertures therein indicative of rotor position which sequentially become aligned with sensing devices, such as light-activated silicon-controlled rectifiers, to cause voltage pulses to be produced indicative of such alignment. Such voltage pulses from the position sensor would be fed to the logic circuitry to cause it to produce the sequence of pulses that would gate or switch the solid state switching devices of the controller, thereby, to supply DC electrical energy to the motor winding. In addition, the logic circuitry may be supplied with a signal indicative of desired motor speed. As is the case with the logic circuitry, the position sensor is not considered to be a part of the present invention. However, suitable position sensing apparatus for a variable reluctance motor is described in U.S. Pat. application Ser. No. 121, 655 filed concurrently herewith in the name of Douglas R. Hamburg and assigned to the Ford Motor Company.

The controller circuit of this invention is particularly useful in an electrically powered vehicle where the motor is connected to drive a vehicle wheel. High torque is generated at low speeds by the idealized wave shape which may be produced by the controller circuitry, and the return of magnetic energy from the winding to the DC source of electrical energy contributes significantly to the overall motor efficiency. Moreover, vehicle braking similar to the braking generated by an internal combustion engine can be provided and the energy generated during vehicle braking applied to the battery without additional controller circuit components.

BRIEF DESCRIPTION OF THE DRAWINGS

FIGS. 6 through 10 are waveforms illustrating time variations of circuit voltages and currents for various possible operating modes of the controller circuitry.

DETAILED DESCRIPTION OF THE INVENTION

Figure 1:
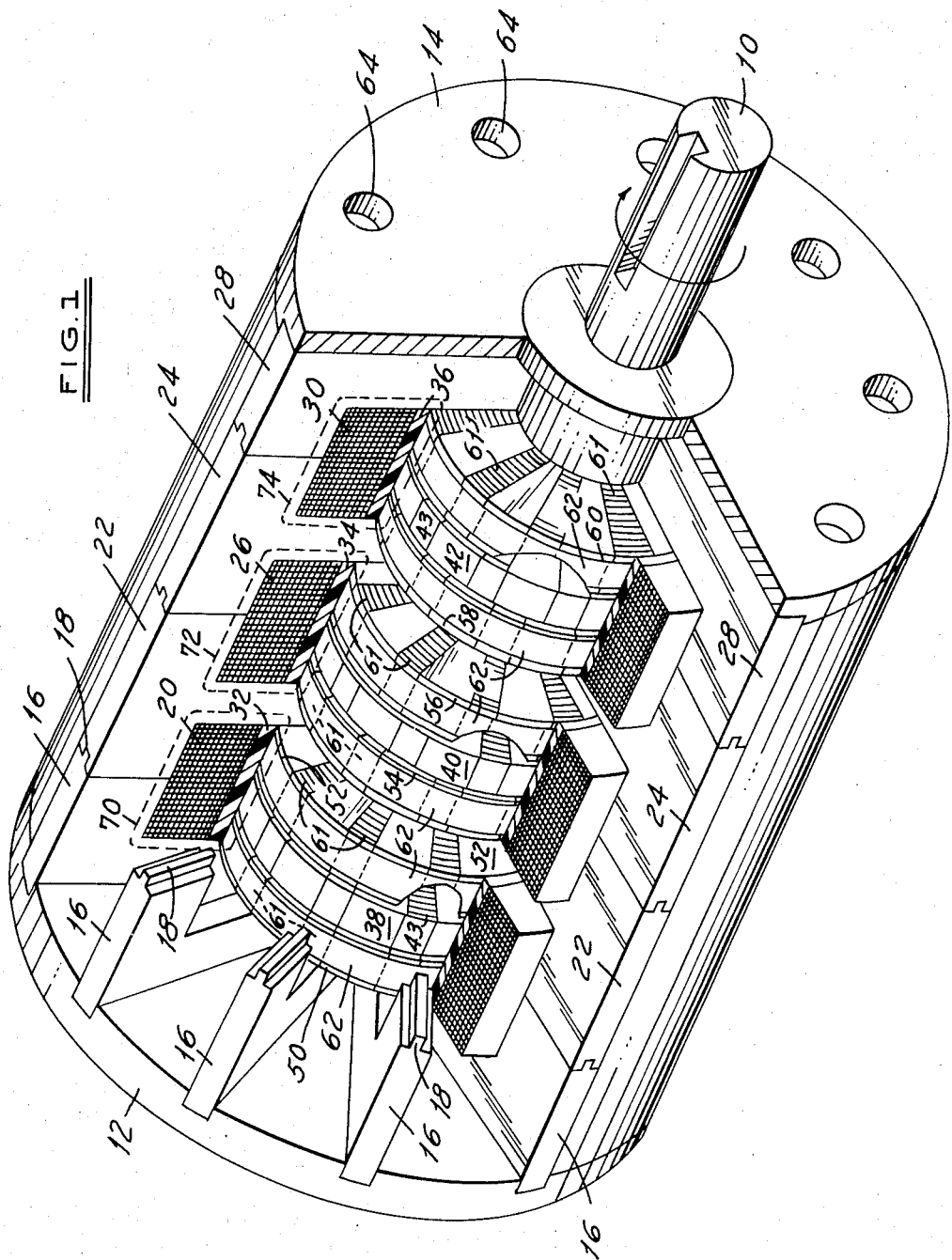
FIG. 1 is a sectional perspective drawing illustrating the construction of a three phase disc-type variable reluctance motor capable of using the controller circuit of the present invention.

FIG. 1 is a sectional view of a disc-type variable reluctance motor. The description of this motor is necessary to facilitate a complete understanding of the controller circuitry of the invention.

With reference now to FIG. 1, a motor shaft 10 is rotatably mounted in two end plates 12 and 14. A plurality of L-shaped members 16 have their longer legs positioned in shallow grooves on the interface of end plate 12. The shorter legs of members 16 project axially inward with the outer surface thereof at the approximate level of the outer periphery of end plate 12. Members 16 are made of laminated steel with the laminations running parallel to the shaft axis and have small radially directed tongues 18 at the inner surfaces of the shorter legs.

A helically-wound, toroidally-shaped first phase winding 20 has one-half of its width fitting into the steps of L-shaped members 16 and is held in place by a plurality of T-shaped members. 22. Members 22 have a groove cooperating with tongue 18. Similar T-shaped members 24 hold the winding 26 of the second phase in place against members 22 and L-shaped members 28 cooperate with T-shaped members 24 to hold the winding 30 of the third phase in place. Member 22, 24, and 28 also are made of laminated steel.

Rims 32, 34, and 36 of fiberglass are positioned against the radially interior surfaces of respective windings 20, 26, and 30 and are connected to the outer peripheries of respective stator discs 38, 40, and 42. Each stator disc comprises a plurality of pie-shaped laminated steel sections 43 separated by a material having a low magnetic permeance, such as aluminum or a reinforced phenolic resin. The number of sections 43 in each disc corresponds to the number of L-shaped members 16, and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40, and rotor discs 58 and 60 are positioned on each side of stator disc 42, to complete the second and third phases. Each rotor disc also has pie-shaped sections 61 of laminated steel surrounded by sections of low permeance material. In a three phase motor, the laminated sections of both the stator discs and the rotor discs have a peripheral width approximately corresponding to the width of member 16 and are surrounded on each side by twice this width of the lower permeance material.

A narrow groove is cut into the periphery of each rotor disc. This groove is filled with a high strength layer of fiberglass 62. Laminated sections 61 of the rotor disc in each phase are aligned with each other. Additionally, laminated sections of the rotor disc in the second phase are spaced peripherally by the width of a section from the laminated sections of the disc in the first phase, and the laminated sections of the rotor discs in the third phase are spaced in the same direction by the width of a laminated section from the corresponding sections of the disc in the second phase. Thus, when sections 61 of rotor discs 50 and 52 are aligned with sections 43 of stator disc 38, section 61 of rotor discs 54 and 56 are aligned with imaginary sections of stator disc 40 adjacent its laminated sections, and sections 61 of rotor discs 58 and 60 are aligned with imaginary sections of stator disc 42 adjacent its laminated sections but located on the sides opposite the imaginary sections of disc 40. Long bolts pass through appropriate holes 64 in end plates 12 and 14 to clamp the parts of the motor together.

The magnetic flux paths are illustrated, respectively, by broken lines 70, 72, and 74. An interval of increasing magnetic permeance for these flux paths begins approximately at the time that the front edges of the laminated rotor sections 61 first begin to come into axial alignment with the stator sections 43 of the motor. In FIG. 1, in which clockwise rotation of the shaft 10 is assumed, the rotor sections 61 of the third phase are at the point at which the magnetic permeance is just beginning to increase as the result of the approaching alignment of the rotor sections 61 with the stator laminated sections 43. The permeance continues to increase until the laminated sections 61 of the rotor are in full alignment with the laminated sections 43 of the stator, at which point the permeance then begins to decrease. In order to produce positive motor torque, the controller circuitry of the invention must apply winding current to the phase during the interval of increasing magnetic permeance, and if motor braking is to be prevented, this winding current must be interrupted before the magnetic permeance begins to decrease as the rotor and stator laminated sections begin to move out of alignment. As was earlier stated, winding current during the interval of decreasing permeance produces negative torque and a braking action, which is undesirable except where a reduction in motor speed and/or a conversion of mechanical energy to electrical energy (regenerative braking) is considered advantageous.

Figure 2:
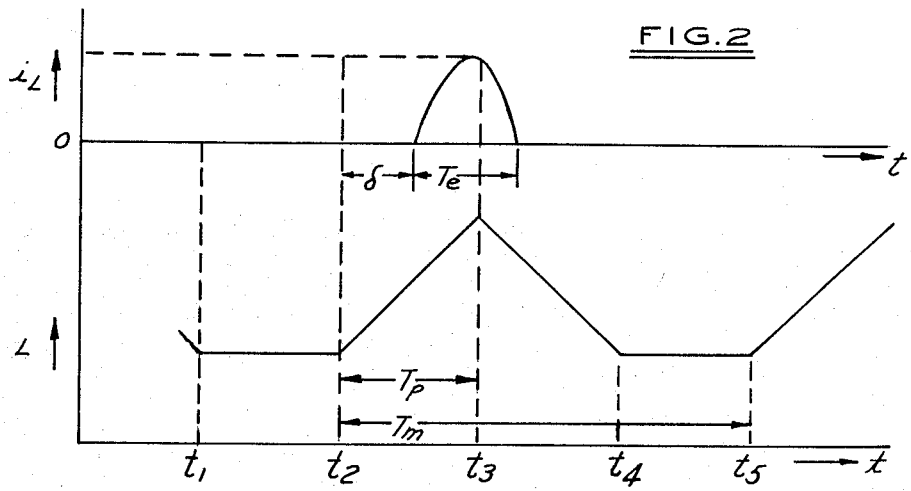
FIG. 2 is a graph illustrating the time variance of the motor winding inductance of a variable reluctance motor.

With particular reference now to that portions of FIG. 2 which illustrates the variation of the motor winding inductance L with time $t$, the periodic manner in which the winding inductance varies as a consequence of the similarly varying magnetic permeance is clearly shown. In the interval from $t_1$ to $t_2$, the magnetic permeance and, hence, winding inductance are substantially constant until the front edge of the laminated sections of the machine rotor approach the back edge of the laminated sections of the machine stator. At this point the magnetic permeance and winding inductance begin to increase. This occurs in the time interval from $t_2$ to $t_3$. At time $t_3$, the laminated sections of the rotor and stator begin to move out of alignment and the magnetic permeance and winding inductance begin to decrease. This continues until time $t_4$, and then a period of substantially constant inductance again takes place, after which the cyclical intervals of increasing and decreasing inductance are repeated. The time interval in which the magnetic permeance increases and during which positive torque may be produced if the motor winding is supplied with current is labeled $T_p$. If winding current is applied during the interval from $t_3$ to $t_4$, then negative torque is produced. The time period identified as $T_m$ is the mechanical period of the machine. The relative magnitude of these periods and of the maximum inductance and minimum inductance of the motor winding are determined by the mechanical design of the machine and are adjusted by the machine designer to satisfy specific performance requirements.

The time duration of the mechanical period $T_m$ and of the interval of increasing magnetic permeance and inductance $T_p$ depend upon the speed of rotation of the motor. At constant rotor speed, these time intervals are constant, but as the rotor speed increases, they necessarily decrease. It should be understood that as motor speed increases, the interval of increasing magnetic permeance and positive torque possibility decreases and that as a result there is less time available in which to perform the various solid state switching functions that produce winding current by the application of DC electrical energy to the windings. Therefore, in many applications it is necessary to use one mode of operation for the controller circuitry at low speed, to use another mode of operation at higher speeds, and to use still other modes of operation at even higher speeds.

Figure 3:
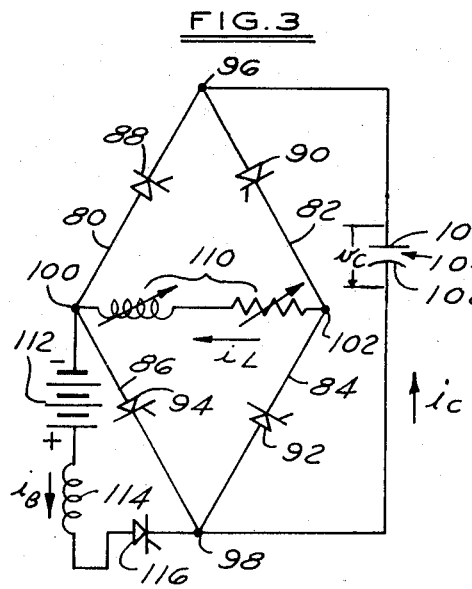
FIG. 3 is a schematic diagram of one embodiment of the invention.

FIG. 3 is a schematic diagram of one embodiment of the invention. A bridge circuit includes arms 80, 82, 84, and 86. These arms include SCRs 88, 90, 92, and 94, respectively. The cathode of SCR 88 is connected to the anode of SCR 90 at terminal or junction 96, and the cathode of SCR 94 is connected to the anode of SCR 92 at terminal or junction 98, terminals 96 and 98 together forming a first pair of opposed terminals of the bridge circuit. The anode of SCR 88 is connected to the anode of SCR 94 at terminal or junction 100, and the cathode of SCR 90 and the cathode of SCR 92 are connected together at terminal or junction 102, terminals 100 and 102 together forming a second pair of opposed terminals.

A capacitor 104 is connected across the first pair of opposed terminals so that one of its plates 106 is connected to the terminal 96 and so that the other of its plates 108 is connected to the terminal 98. The motor winding 110 is connected across the second pair of opposed terminals 100 and 102. This motor winding 110 is schematically illustrated as including a variable inherent resistance and a variable inductance. The inherent resistance of the motor winding is variable as a result of motor operation over a wide range of speed and torque conditions. Of course, the winding inductance varies in the manner previously described in connection with the graph of FIG. 2.

A storage battery 112, the DC source of electrical energy, has its negative terminal connected to terminal 100 of the bridge circuit. The inductance 114 is the inherent inductance associated with the battery 112 and is illustrated in the schematic diagram to emphasize the necessity of considering it in the design and operation of the overall controller circuitry. The positive terminal of the storage battery 112 is connected to the anode of an SCR 116, the cathode of which is connected to the bridge circuit at the terminal 98.

Figure 4:
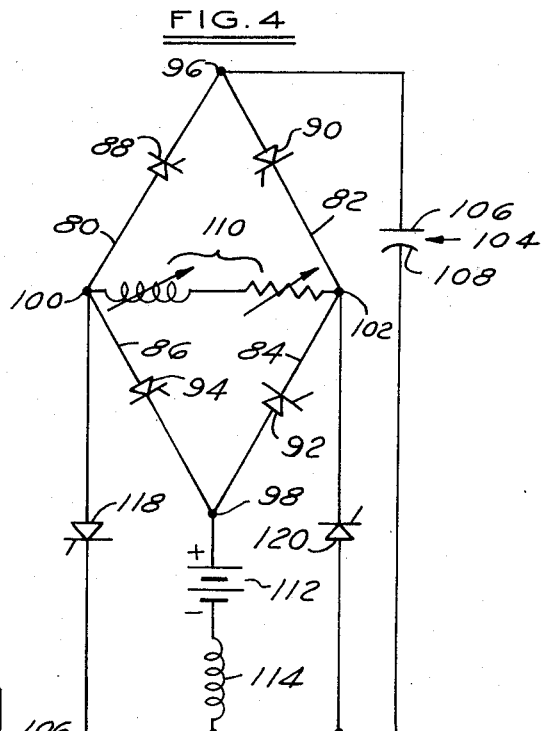
FIG. 4 is a schematic diagram of another embodiment of the invention.

With reference now to FIG. 4, it may be seen that the connections of the bridge arms and of the motor winding are identical to that shown in FIG. 3. However, the FIG. 4 circuit has the positive terminal of the storage battery 112 connected to terminal 98. The negative terminal of the storage battery 112 is connected to the cathode of an SCR 118, the anode of which is connected to the terminal 100. The negative terminal of the storage battery 112 is also connected to the anode of an SCR 120, the cathode of which is connected to the terminal 102. Also, in the FIG. 4 controller circuit, the plate 108 of the capacitor 104 is connected to the negative terminal of the battery 112, rather than to the terminal 98 as it is in the FIG. 3 circuit.

Figure 5:
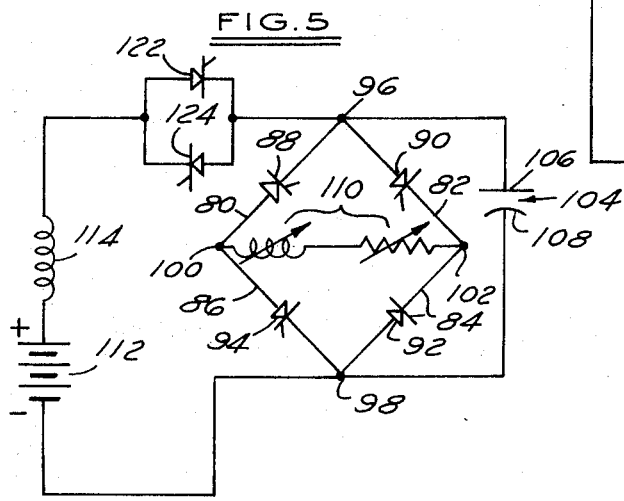
FIG. 5 is a schematic diagram of still another embodiment of the invention.

With reference now to the controller circuitry shown in FIG. 5, it may be seen that the arms of the bridge circuit, the motor winding 110, and the capacitor 104 are connected in the same manner as in the FIG. 3 circuit. The FIG. 5 circuit differs, however, in that the negative terminal of the storage battery 112 is connected to the terminal 98, while its positive terminal is connected to the anode of an SCR 122 and to the cathode of an SCR 124. SCRs 122 and 124 are connected in anti-parallel with one another and in series with the storage battery 112 through the connection of the cathode of SCR 122 with the anode of the SCR 124 and with the terminal 96.

The circuit of FIG. 3 is unilateral in the sense that it is capable of supplying electrical energy from the source thereof to the motor winding, but it is incapable of transferring energy from the motor winding to the energy source. The controller circuits of FIGS. 4 and 5 are bilateral because they permit energy interchange between the energy source and load and vice versa.

OPERATION

The primary function of the controller circuitry is to periodically apply electrical energy to the motor winding to produce current therein and positive torque as the result. The logic circuitry (not shown) determines the manner in which the various solid state switching devices of the controller circuitry are triggered in order to produce the winding current during the appropriate time intervals. Various operational modes, determined by the sequence and spacing of triggering pulses from the logic circuitry, for the controller circuits of FIGS. 3, 4, and 5 are possible. Moreover, several operational modes may be used at different times with a single controller circuit, the operational mode employed at any particular time being determined by reluctance motor speed and torque requirements at that time. Thus, the logic circuitry for a given application must be designed to supply the proper sequence and spacing of triggering pulses to place the controller circuitry in the desired operational mode.

The controller, when thus supplied with triggering pulses, applies electrical energy to the variable reluctance motor at a pulse frequency that satisfies the synchronous requirements previously discussed, and it varies the magnitude of this energy in accordance with the torque requirements of the load. In general, motor torque may be both positive and negative to satisfy motoring and regenerative load conditions. One of the merits of variable reluctance machines is that the mechanical torque produced is directly proportional to the square of the RMS value of the winding current, that is, all current, regardless of waveform, in the exciting winding during increasing or decreasing inductance intervals contributes to the production of positive and negative mechanical torque, respectively. Therefore, the torque control of a reluctance machine is achieved by controlling the magnitude of the winding RMS current. The pulse frequency of this current determines machine speed.

Voltage Control Mode. In this mode of operation, current pulse magnitude is varied by controlling the magnitude of the voltage stored in the capacitor 104 at the end of a current pulse. This feature can be used in conjunction with most of the other control modes to be described hereinafter and can be considered as the voltage regulatory function of the controller system. It is useful as a means for controlling the motor RMS current and, hence, motor torque and also as a means for protecting system components from excessive voltage levels. It also serves to reduce the number of current pulses into and out of the energy source, thus improving its efficiency.

Figure 6:
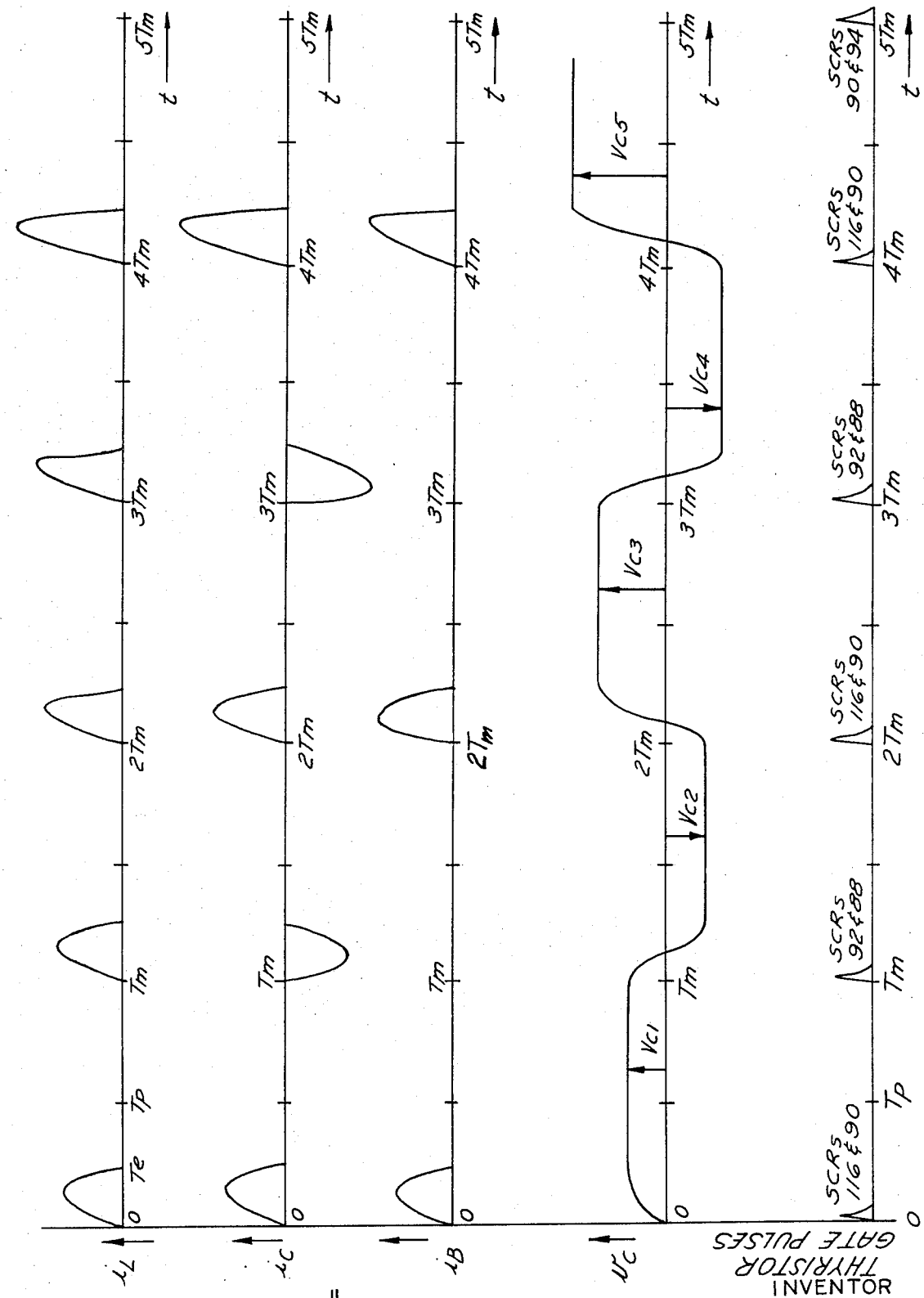

The voltage control mode will now be described for the circuit of FIG. 3 in conjunction with the waveforms of FIG. 6 for $i_L$ (current through the inductive-resistive motor winding 110), $i_C$ (current through the capacitor 104), $V_C$ (voltage across the capacitor 104), $i_B$ (current through the storage battery source 112 and its associated inductance 114), and thyristor (SCR) gate or trigger pulses for the operation of the controller circuitry of FIG. 3. In FIG. 6, $T_m$ represents one pole pitch or one repeatable inductance variation, $T_p$ represents the useable (increasing inductance) interval of a pole pitch or repeatable inductance variation, and $T_e$ represents the electrical period, that is, the time interval during which current is present in the motor winding and the duration of which is determined solely by the circuit parameters in accordance with the following equation:

$$T_e = \pi \sqrt{L_{min} C} + 2.47 \, XC$$

where $X = np/a \, (L_{max} - L_{min})$ and where $L_{max}$ and $L_{min}$ are the maximum and minimum motor winding inductances, respectively; "p" is the number of repeating inductance variations per revolution of the motor rotor; "n" is the rotor instantaneous speed in revolutions per unit of time; "a" is the pole span for the motor; and "C" is the capacitance of the capacitor 104. It should be noted from this expression that, at a given motor speed, there is no control over the electrical period $T_e$; $T_e$ is fixed by the design values of the capacitor 104 and of the minimum and maximum inductance of the motor winding 110.

Operation begins in the voltage control mode with the capacitor 104 initially uncharged. Gating pulses are applied at time $t=0$ to the SCRS 116 and 90, which become conductive, and current pulses are produced in the battery 112, the motor winding 110, and the capacitor 104, thereby, charging this capacitor to the voltage $V_{C1}$. These waveforms are shown in FIG. 6. This circuit is an underdamped LC circuit, and the voltage $V_{C1}$ will therefore equal a value somewhat less than twice the battery potential, the exact value depending upon the magnitude of the damping. The fact that the capacitor 104 is charged to a value greater than the source voltage with the bottom terminal 108 thereof being positive causes the SCRs 116 and 90 to become reverse-biased and to become nonconductive, or, commutated.

The circuit can be activated again, in the manner described below, as soon as the SCRs have passed through a sufficient time delay to insure the attainment of a nonconductive state. However, it is assumed for the purpose of this description that the next current pulse will not exist until the onset of the next mechanical period of increasing magnetic permeance.

At time $t = T_m$, SCRs 92 and 88 are rendered conductive by the application of gating pulses to them. This reverses the polarity of the voltage across the capacitor 104, leaving the terminal 106 positive and at a voltage level $V_{C2}$ which will be somewhat smaller in magnitude than $V_{C1}$, this again depending upon the relative damping of the LC circuit. The current in the motor winding 110 is in the same direction as during the current pulse previously described, and the battery circuit is in an open condition. The accumulation of charge on the capacitor 104 results in commutation of SCRs 92 and 88.

AT time $t = 2 T_m$, SCRs 116 and 90 are again triggered, and there is a current through the motor winding as previously occurred and as shown in FIG. 6. However, this time the battery and initial capacitor voltages are aiding one another, resulting in a net voltage of somewhat less than three times the source potential being applied to the circuit. Thus, the magnitude of the current pulse is larger than that of the previous pulses, but the pulse period remains constant. The capacitor will accumulate a charge with the terminal 108 being positive and the capacitor voltage $V_{C3}$ being somewhat less than four times the source voltage.

AT $t = 3 T_m$, SCRs 92 and 88 are again gated. This again produces a current through the capacitor 104 and the motor winding 110 and reverses the polarity of the charge on the capacitor so that terminal 106 again becomes positive with respect to terminal 108. The capacitor then has the voltage $V_{C4}$ shown in FIG. 6.

At time $= 4 T_m$, SCRs 116 and 90 are triggered causing the battery to further charge the capacitor 104 to a voltage $V_{C5}$, a value somewhat less than 5 times the source voltage, while supplying another current pulse through the motor winding 110.

Theoretically, this sequence of charging the capacitor 104 by triggering SCRs 116 and 90 and reversing the charge by triggering SCRs 92 and 88 could continue indefinitely. The capacitor 104 would eventually arrive at a steady state voltage pattern, and no further increase in voltage would occur unless the power dissipation of the circuit changed. However, this sequence offers no measure of control over current, and, furthermore, the resultant steady state voltage levels are often beyond permissible levels for the solid state switching devices.

In order to achieve control of the RMS current through the winding, the current pulse peaks have to be controlled, pulse width being invariant. Preferably, the current pulse peak is kept between a minimum valve, which occurs with the capacitor 104 initially uncharged as shown for the first current pulse in FIG. 6, and a maximum value, which may be about four or five times the minimum value. This is accomplished by skipping one or more of the charging cycles which occur when SCRs 116 and 90 are triggered, and by replacing these cycles with a simple reversing step. In this reversing step, SCRs 90 and 94 are gated and current is provided in the circuit formed by the capacitor 104, the SCR 90, the motor winding 110, and SCR 94. The capacitor 104 reverses its charge, terminal 108 becoming positive at the end of the pulse, and useful current through the motor winding is produced. Due to the dissipation in the winding resistance and any other dissipative elements present in the circuit, the voltage across the capacitor 104 is less at the end of the pulse than at the beginning. Thus, a sequence of alternate gatings of SCRs 92 and 88 and then SCRs 90 and 94 will gradually discharge the capacitor into the motor winding, this drawing no energy from the DC battery source 112.

In the voltage control mode of operation, the capacitor 104 is first charged to the voltage required to produce a desired power level in the motor winding 110. Then, the motor winding is supplied only from the energy stored in the capacitor 104 until the voltage on the capacitor becomes too low. This minimum voltage level is determined primarily by the reverse-bias voltage required on the capacitor to satisfactorily commutate the solid state switching devices. When this voltage minimum is reached, or, at any alternate cycle initiation, SCRs 116 and 90 are triggered instead of SCRs 90 and 94. The capacitor is thereby recharged from the battery source 112. This triggering of SCRs 116 and 90, rather than of SCRs 90 and 94, may, if desired, be used on every other cycle until the desired voltage level on the capacitor 104 is attained. In general, energy is drawn from the source through the SCR 116 only as it is needed to maintain a given power level in the motor winding.

The voltage control mode of operation of the controller circuitry of FIG. 4 is very similar to that for the circuitry of FIG. 3. The capacitor 104 is charged from the battery 112 through the motor winding 110 by triggering SCRs 92 and 88, terminal 106 of the capacitor 104 thus becoming positive with respect to terminal 108 thereof. The polarity of the charge across the capacitor 104 can then be reversed by triggering SCRs 118 and 90, terminal 108 of the capacitor then becoming positive with respect to terminal 106. The charge can then be reversed from this condition to make terminal 106 again positive with respect to terminal 108, without recharging from the battery source 112, by gating SCRs 120 and 88 instead of SCRs 92 and 88. The FIG. 4 controller circuitry has an added advantage over the FIG. 3 circuitry in that the capacitor 104 can be discharged rapidly through he motor winding and battery in series, thus, returning most of its energy to the source. To accomplish this, terminal 106 of the capacitor 104 must be positive; SCRs 90 and 94 are then gated resulting in current through the motor winding and into the positive terminal of the battery source 112. This feature is very desirable for the protection of the controller circuitry against excessive voltage buildup across the capacitor 104. It is also useful in regenerative operation of the motor winding.

The voltage control mode of operation for the controller circuitry of FIG. 5 is identical to that for the circuitry of FIG. 3, except for the charging cycle. With the controller circuitry of FIG. 5, the capacitor 104 can be charged independently of the motor winding by gating only the SCR 122. Thus, the capacitor can be charged at any time irrespective of the motor winding inductance variations illustrated in FIG. 2. It should be noted, however, that the polarity of the charge on the capacitor 104 must be reversed after a battery charging cycle through SCRs 90 and 94 and the motor winding circuit. The separate charging circuit permits higher frequency operation in some applications. Also, as in the case of the FIG. 4 circuitry, the capacitor 104 of the FIG. 5 circuitry can be discharged into the motor winding to reduce its voltage. In this case, with the terminal 106 of the capacitor positive, SCRs 90, 94, and 124 are triggered. While $V_C$ is greater than the potential of the battery 112, current out of the capacitor 104 divides between the battery and motor winding circuits. As $V_C$ drops below battery potential, SCR 124 becomes reverse-biased and becomes nonconductive, and the remaining capacitor charge dissipates through the motor winding. If this process is to function properly, some inductance is required in either the battery or capacitor.

Circulating Current (Free-Wheeling) Mode of Operation. As the sole means of RMC current control, the above described voltage control mode of operation would be seriously limited by the inability to vary pulse width. In variable speed reluctance motors, the electrical pulse with $T_e$ could be designed to equal the interval of increasing inductance $T_p$ for the highest expected motor speed. At this speed, and down to about 70 percent thereof, a considerable measure of control would exist by use of the variable voltage technique described. However, at lower speeds, the duration of the current pulse in the motor winding with respect to the interval $T_p$ becomes shorter and the RMS current decreases by the square root of the ratio of the electrical period $T_e$ to the period $T_p$. For improved efficiency, it is desirable to have the current pulse occupy the entire interval of increasing inductance $T_p$ and to reduce the current pulse peaks.

To increase the duration of the motor winding current pulses, a technique termed "free-wheeling" is used. With this type of operation, the motor winding is disconnected from the energy source and the capacitor 104 and is short-circuited through solid state switching devices. The energy stored in the magnetic field of the motor winding 110 at the instant of shorting will cause current to circulate around the short-circuit loop, producing useful torque proportional to the square of the RMS current. In the paragraphs which follow, the free-wheeling mode of operation is described in connection with the controller circuitry of FIG. 3, the resultant waveforms being shown in FIG. 7.

It is assumed that the capacitor 104 is charged at the time $t = 0$ in FIG. 7 to a desired voltage $V_{CO}$ (shown in FIG. 7 as a negative voltage) with the terminal 106 positive with respect to the terminal 108 at the beginning of the mechanical period whereat the inductance of the motor winding 110 starts to increase. At this time, SCRs 90 and 94 are triggered by the application to them of thyristor gate pulses. This produces a current pulse ($i_C$) around the loop formed by the capacitor 104, the SCR 90, the motor winding 110, and the SCR 94.

At any time after the current pulse has passed its peak, either SCR 88 or SCR 92 is gated. If the SCR 92 is gated, then the motor winding 110 is short-circuited and the current therethrough "free-wheels" through SCRs 94 and 92. This is a circulating current produced by the magnetic field of the winding, and it diminishes in magnitude as losses occur. The capacitor 104 continues its charge reversal through the SCR 90 and the short-circuited motor winding and SCR combination. The capacitor voltage at the instant that the current pulse peak occurs is equal to the source voltage, the terminal 108 at this instant being positive with respect to the terminal 106, and continues to increase in magnitude with this polarity. The gating of the SCR 92 places the capacitor 104 across the SCR 90, thereby reverse-biasing the SCR 90 and causing it to commutate in a few micro-seconds. Current continues to free-wheel, or, circulate, around the loop formed by the motor winding and SCRs 94 and 92, this loop being isolated from the rest of the system, and the current decaying at a rate determined by the natural time constant of the loop circuit.

The SCR 90 must remain in its reverse-biased condition for a sufficient interval to insure its commutation. After this interval, the motor winding can be "recharged" from the capacitor 104 by the application of a gating pulse to the SCR 88, the purpose of this being to increase winding current and motor torque. Gating the SCR 88 reverse-biases SCR 94 causing it to become commutated. At this time, current is present in the loop formed by the capacitor 104, the SCR 92, the motor winding 110, and the SCR 88; and it increases to a peak determined by the amount of charge stored in the capacitor 104 at the instant the SCR 88 is gated.

After the current pulse peak has been reached, the motor winding can again be short-circuited and placed in a free-wheeling mode. However, in order to reduce the current loading of the solid state switching devices, it may be desirable to alternate the free-wheeling loops. This may be accomplished by using the motor winding in conjunction with the SCRs 90 and 88 to produce a short-circuited winding and free-wheeling, rather than using the SCRs 94 and 92 to do this. When a gating pulse is applied to the SCR 90, the current through the motor winding 110 circulates in a free-wheeling mode through the SCRs 90 and 88. The capacitor 104 continues its charge reversal through the SCR 92, the short-circuited motor winding 110, and the SCR 88. The capacitor 104 completes its reversal causing the terminal 106 thereof to once again become positive. When the capacitor current reaches zero, the SCR 92 becomes reverse-biased and is commutated.

The conditions in the circuit at this time are the same as they were at the time $t = 0$, except that the capacitor voltage has decreased in magnitude. The process outlined in the immediately preceding paragraphs can be repeated until the capacitor voltage becomes insufficient to safely commutate the various SCRs. Alternatively, it may be desirable to increase the capacitor voltage to raise the current level in response to increased motor output demands. In either case, the capacitor 104 can be recharged, during any step when the terminal 106 thereof is positive, by gating the SCRs 116 and 90.

Still another alternative at this time is to end the free-wheeling cycle. This may be accomplished by the application of a triggering pulse to the SCR 94. This causes the SCR 88 to become commutated and permits the capacitor 104 to discharge through the circuit formed by SCR 90, the motor winding 110, and the SCR 94 so that the terminal 108 of the capacitor becomes positive with respect to the terminal 106 thereof. This is the situation illustrated in FIG. 7. In FIG. 7, two free-wheeling cycles have been illustrated during the time interval from $t = 0$ to $t = T_p$. The second free-wheeling cycle could easily have been omitted by the elimination of the triggering pulse applied to the SCR 90 after the pulse applied to the SCR 88. However, it should be borne in mind that it is desirable to fill as much of the interval of increasing magnetic permeance with motor winding current as is possible. Also, it is desirable to produce a motor winding current waveform having the generally trapezoidal shape illustrated in FIG. 7.

There are several means of controlling the RMS current during a free-wheeling cycle. For example, the duration of the free-wheeling cycle as a portion of the useable interval of increasing magnetic permeance may be controlled. Also, the initial value of free-wheeling current through the short-circuited motor winding connection can be controlled and varied over a small range by controlling the interval between the current pulse peak and the gating of the SCR that initiates the short-circuit. Moreover, the minimum free-wheeling current or the current level at which the short-circuit is ended may be controlled, as may the magnitude of the current peaks occuring during the capacitance charge reversal by varying the capacitor voltage as previously described.

The free-wheeling mode of operation can also be applied, in a manner obvious from the preceding to a person skilled in he art, to the controller circuits of FIGS. 4 and 5.

Pulse Frequency Control Mode. Another general operational mode for controlling motor RMS current is obtained by varying the number of current pulses applied to the motor winding per revolution. If there are "p" repeatable intervals of increasing magnetic permeance per revolution, one pulse being applied per interval, a maximum of "p" pulses per revolution can be applied. By eliminating a number of these pulses so that the actual number of pulses is "h," the RMS current is reduced by the square root of the ratio of $h$ to $p$. This relationship is independent of pulse waveform. However, the technique is most useful when associated with single pulse control and with motors having relatively large values of $p$ and speed. A typical waveform for the motor winding current $i_L$ when pulse elimination is used is illustrated in FIG. 8, wherein ten full periods of mechanical inductance variation are illustrated and wherein the intervals of increasing magnetic permeance $T_p$ are shown for each of the intervals. It should be noted that pulses are missing from the odd-numbered mechanical periods, that is, from 0 to $T_m$, from 2 $T_m$ to 3 $T_m$, etc.

Pulse frequency can be altered in yet another manner with the controller of the invention, and this mode is most useful for variable reluctance motors having a small number of repeatable inductance variations per revolution. At low speeds of the motor, the electrical pulse period $T_e$ is usually much smaller than the mechanical interval of increasing inductance $T_p$. Therefore, a number of electrical pulse periods can easily be fitted into one mechanical period. With the controller circuitry of FIG. 3, this can be accomplished by gating the pair of SCRs 116 and 90 alternately with the pair of SCRs 92 and 88. The resulting bursts of sine pulses are illustrated in FIG. 9. Although this type of control is widely used in many variable speed drive controllers, the resultant waveform is not as efficient as the free-wheeling waveform of FIG. 7 and requires higher values of peak current for a given RMS current.

Pulse Shifting Control Mode. This operational mode can be applied with any of the above described operational modes, but it is usually inadequate as the sole means of torque control. With reference to FIG. 2, it may be seen that positive motor torque may be produced as the instant that $t = t_2$. If the magnitude of the winding current $i_L$ is at or near its maximum value at this instant and maintained at this value until almost $t = t_3$, maximum torque per pulse is produced. Because the buildup of winding ampere-turns requires a finite rise time, it is sometimes desirable, therefore, to initiate a pulse during the interval between $t_1$ and $t_2$. Although this increases the resistive power losses somewhat because no useful torque is produced in the interval, the resulting increase in useful torque during the interval of increasing inductance will often compensate for this loss penalty. The current pulse could also be shifted into the interval between $t_3$ and $t_4$, but this results in the additional penalty of negative torque production.

Figure 10:
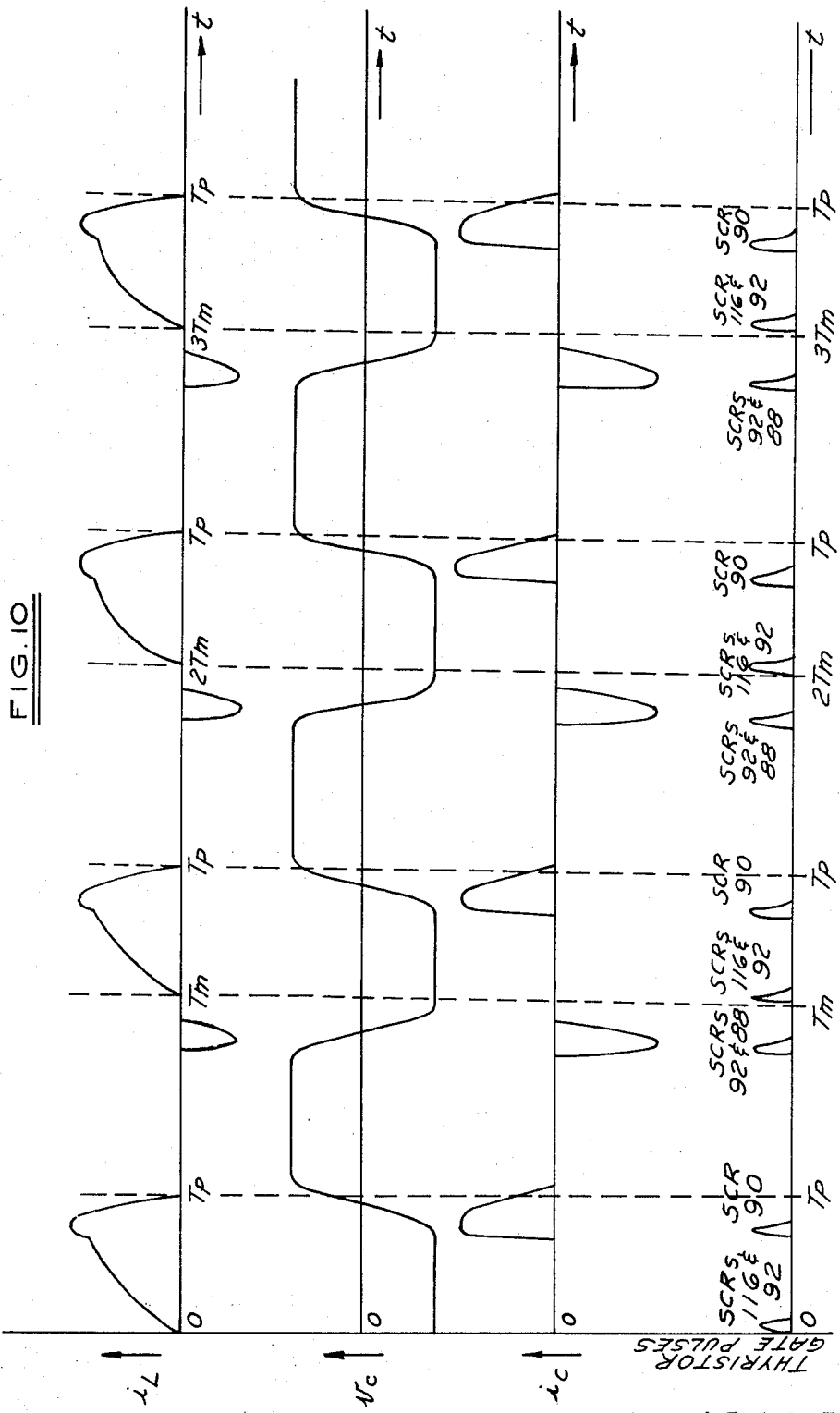

Parallel Commutation Mode of Operation. The controller circuitry of FIGS. 3 through 5 may also be operated as simple parallel-commutated circuits. In a variable reluctance motor, this mode of operation results in a somewhat triangular winding current waveform as shown in FIG. 10, the waveforms shown being for parallel commutation operation of the circuit configuration of FIG. 3.

In the application of the parallel commutation mode to the circuitry of FIG. 3, the capacitor 104 must have an initial charge such that the terminal 106 thereof is positive with respect to the terminal 108. Gating pulses are then applied to the SCRs 116 and 92 to cause a current in the circuit consisting of the battery source 112, the SCRs 116 and 92, and the motor winding 110. Current $i_L$ increases in the motor winding in an exponential manner as shown in FIG. 10.

At a predetermined current limit, a gating pulse is applied to the SCR 90. Because of the initial capacitor charge, the SCR 92 is reverse-biased and becomes nonconductive. A sine pulse current thus results through the circuit formed by the capacitor 104, the SCR 90, the motor winding, the battery source 112, and the SCR 116. This reverses the charge on the capacitor 104 so that its terminal 108 becomes positive.

Current flow can be ended by allowing this sine pulse to continue until zero current is reached, after which SCRs 116 and 90 self-commutate. The charge on the capacitor 104 must be reversed in order to repeat the above sequence of steps. As an alternative to the termination of current as stated above, the SCR 88 can be triggered. This allows the winding current to free-wheel through the SCRs 88 and 90. The capacitor 104 completes its charge reversal and recharges so that the terminal 108 thereof becomes positive, this occurring as a result of current through the battery source 112, the SCR 116, and the short-circuited motor winding 110.

The free-wheeling can be terminated by the application of a gating pulse to the SCR 92. This reverse-biases the SCR 90 rendering it nonconductive. The SCRs 92 and 88 self-commutate at the end of the sine pulse, and the charge on the capacitor 104 will have reversed so that the terminal 106 thereof will have become positive with respect to the terminal 108.

Self-Synchronous Mode of Operation. When a variable reluctance motor is operated as a true synchronous machine, that is, with no position feedback and with a fixed pulse frequency, pulse-shifting is the natural mechanism by which the motor varies its developed torque to meet torque requirements. Because this mode of operation is very similar to that used fro other types of synchronous machines, the concept of a torque angle is introduced. With reference to the $i_L$ waveform of FIG. 2, the torque angle δ is defined as the interval between the time $t_2$ and the zero-crossing positive slope instant of the current pulse. The variable reluctance motor adjusts itself to satisfy external load torque demands by shifting its rotor position with respect to the electrical pulse period, as does a conventional synchronous machine. At light loads, the torque angle δ is large and the current pulse overlaps considerably into the negative torque interval between $t_3$ and $t_4$. Since both the maximum current and the electrical period $T_e$ are invariant in this mode of operation, there is an angle (usually approximately zero) for which the net positive developed torque is maximum. If the load torque demand is greater than this value, the motor falls out of synchronization with the current pulse and goes into an unstable condition.

For self-synchronous operation as applied to the controller circuitry of FIG. 1, gating pulses are applied at an invariant pulse rate to the SCRs 116 and 90, or, to the SCRs 94 and 90. Then gating pulses are applied to the SCRs 92 and 88. The decision as to whether the SCR 116 or the SCR 94 is to be used with the SCR 90 is determined by the desired voltage level on the capacitor 104.

Generator Mode of Operation. When the shaft is driven by an external motor, the reluctance machine can be used as a source of electrical energy. Like an induction generator, a reluctance generator has no source of excitation and must derive excitation from an external source.

The controller circuitry of the invention can be used to control generator action of a variable reluctance machine whenever mechanical energy is supplied to the machine shaft. This mechanical energy may, for example, be supplied as kinetic energy occurring during a motor vehicle braking operation. For generator action, the battery-capacitor combination in any one of the circuits of FIGS. 3 through 5 must be synchronously switched into the machine winding during the interval between $t_3$ and $t_4$ illustrated in FIG. 2, that is, during the interval of decreasing magnetic permeance. Each of the controller circuits of FIGS. 3 through 5 are capable of this type of operation. However, in the configuration of FIG. 3, the energy removed from the shaft is transferred into the capacitor 104 by the switching process and cannot be returned to the battery source 112. Therefore, this configuration is applicable for only short time regenerative action.

The current waveforms and magnitudes which occur during a condition of decreasing magnetic permeance are very similar to those which occur during increasing permeance. Therefore, with slight modifications to the logic circuitry, the previously described modes for operating the controller circuits are applicable for variable reluctance generator operation.

In the generator mode of operation with all winding current pulses occurring during intervals of decreasing magnetic permeance, the pulse period $T_e$ is as follows:

$$T_e = \pi \sqrt{L_{max} C} - 2.47 \times C$$

The above equation should be compared with the equation previously given for the electrical period during motor operation. Operation of the controller citcuitry of FIG. 4 in the generator mode is described in the paragraphs which follow.

With the capacitor 104 initially uncharged, gating pulses are applied to the SCRs 92 and 88. A current pulse appears in the circuit formed by the capacitor 104, the battery source 112, the SCR 92, the motor winding 110, and the SCR 88. The SCRs 92 and 88 self-commutate at the end of the current pulse. However, the capacitor 104 is charged to a higher voltage due to the fact that the motor winding acts as an energy source, the energy from this source being collected on the capacitor 104.

During the next interval of decreasing magnetic permeance, the energy on the capacitor 104 can be returned to the battery source 112 by the application of gating pulses to the SCRs 90 and 94. A current pulse of similar period and shape as above flows into the positive terminal of the battery source 112. The capacitor then has a nearly zero charge and a low voltage.

If the above process is repeated over many cycles, the voltage on the capacitor 104 at the end of the discharge cycle gradually increases and approaches the battery source potential. As this condition is approached, the current pulse magnitude decreases and equals zero when the capacitor voltage, at the end of the discharge into the battery, is equal to the source potential. To prevent this situation, or, to increase the current pulse magnitude at any time, the step described in the previous paragraph can be replaced by the application of gating pulses to the SCRs 90 and 118. This causes the capacitor voltage to reverse itself and causes the accumulation on the capacitor of extra charge from the generator. At the end of the current pulse thus produced, the terminal 106 of the capacitor 104 is negative. During the next cycle and at the time that the SCRs 92 and 88 are triggered, the capacitor voltage aids the battery source voltage, and the current pulse magnitude becomes relatively large.

As in motoring control, the frequency with which the SCRs 90 and 118 are triggered to replace the SCRs 90 and 94 is the means for controlling the capacitor voltage. By the regulation of this voltage, generator RMS current, torque, and power output can be effectively controlled.

The previously described modes of operation for the reluctance motor can be similarly adapted for generator action.

Based on the foregoing description of the invention, what is claimed and desired to be protected by Letters Patent is:

1. In a variable reluctance motor having a winding that has a varying inductance during motor operation, a circuit for controlling the application of electrical energy to said winding, which comprises: a bridge circuit including a first thyristor, a second thyristor, the cathode of said first thyristor being connected to the anode of said second thyristor, a third thyristor, a fourth thyristor, the anode of said third thyristor being connected to the cathode of said fourth thyristor, the anode of said first thyristor being connected to the anode of said fourth thyristor, and the cathode of said second thyristor being connected to the cathode of said third thyristor, and said motor winding being connected at one of its terminals to the junction of said first and fourth thyristors and being connected at its other terminal to the junction of said second and third thyristors; a direct current source of electrical energy having first and second terminals, said first terminal thereof being connected to one of said bridge circuit thyristor junctions; a fifth thyristor having its anode connected to said second terminal of said source of electrical energy and having its cathode connected to one of the thyristor junctions of said bridge circuit; and a capacitor having first and second terminals, said first terminal of said capacitor being connected to the junction of said first thyristor with said second thyristor.

2. A circuit in accordance with claim 1, wherein said second terminal of said capacitor and the cathode of said fifth thyristor are connected to said bridge circuit at the junction of said third thyristor with said fourth thyristor, and wherein said first terminal of said source of electrical energy is connected to said bridge circuit at the junction of said first thyristor with said fourth thyristor.

3. A circuit in accordance with claim 1, wherein said first terminal of said source of electrical energy is connected to said bridge circuit at the junction of said third thyristor with said fourth thyristor, wherein the second terminal of said source of electrical energy is connected to said second terminal of said capacitor, and wherein the cathode of said fifth thyristor is connected to said bridge circuit at the junction of said second thyristor with said third thyristor.

4. A circuit in accordance with claim 1, wherein said second terminal of said capacitor and said first terminal of said source of electrical energy are both connected to the junction of said third thyristor with said fourth thyristor, and wherein the cathode of said fifth thyristor is connected to the junction of said first thyristor with said second thyristor.

5. A circuit in accordance with claim 3, which further includes a sixth thyristor having its anode connected to the junction of said first thyristor with said fourth thyristor and having its cathode connected to said second terminal of said source of electrical energy.

6. A circuit in accordance with claim 4, which further includes a sixth thyristor having its anode connected to the cathode of said fifth thyristor and having its cathode connected to the anode of said fifth thyristor.

7. A process for supplying electrical energy from a source thereof to the winding of a variable reluctance motor, said winding being connected across opposed terminals of a bridge circuit having four arms, each of which contains a solid state switching device, and said bridge circuit having a capacitor connected thereto, which comprises the steps of: charging said capacitor by causing a flow of charge from said electrical source through said motor winding and at least a portion of said bridge circuit and into one terminal of said capacitor; reversing the charge on said capacitor by causing a flow of charge through a portion of said bridge circuit and said motor winding into the opposite terminal of said capacitor.

8. The process of claim 7, which further includes the steps of: repeating the two steps of claim 7 until the voltage on said capacitor has increased to a predetermined level; and discharging said capacitor until its voltage has decreased to a second predetermined level.

9. The process of claim 8, wherein said step of discharging said capacitor is accomplished by repeatedly reversing its charge by causing flow thereof through said motor winding and portions of said bridge circuit, said repeated reversing of charge being done with said source disconnected from said bridge circuit.

10. A process for applying electrical energy from a source thereof to the winding of a variable reluctance motor connected across opposed terminals of a bridge circuit having four arms and each of said arms containing a solid state switching device and a capacitor being connected to said bridge circuit, which comprises the steps of: accumulating a charge on said capacitor; discharging and reversing the charge on said capacitor by causing a flow of charge through said motor winding and a portion of said bridge circuit; short-circuiting said motor winding while said charge is flowing; and again reversing the charge on said capacitor by causing a flow of charge from said capacitor through said motor winding and a portion of said bridge circuit.

11. A process in accordance with claim 10, which further includes the steps of: again short-circuiting said motor winding while charge flows therethrough; and discharging said capacitor.

* * * * *